United States Patent [19]

Brockway et al.

[11] 4,338,114
[45] Jul. 6, 1982

[54] LASER TREATMENT METHOD FOR IMPARTING INCREASED MECHANICAL STRENGTH TO GLASS OBJECTS

[75] Inventors: M. Clifford Brockway; Craig T. Walters, both of Columbus, Ohio

[73] Assignee: Liberty Glass Company, Sapulpa, Okla.

[21] Appl. No.: 180,140

[22] Filed: Aug. 21, 1980

[51] Int. Cl.³ .............................................. C03B 29/02
[52] U.S. Cl. .......................................... 65/28; 65/104; 65/111; 65/DIG. 4; 219/121 LE; 219/121 LF; 219/121 LM
[58] Field of Search ............. 65/28, 104, 111, DIG. 4, 65/284, 112, 120; 219/121 LE, 121 EM, 121 LM, 121 LF

[56] References Cited

U.S. PATENT DOCUMENTS

| | | | |
|---|---|---|---|
| 3,259,480 | 7/1966 | Michalik et al. | 65/28 |
| 3,538,298 | 11/1970 | Duston et al. | 219/121 |
| 3,588,440 | 6/1971 | Morse | 219/121 |
| 3,656,922 | 4/1972 | Budd | 65/111 X |
| 3,663,793 | 5/1972 | Petro et al. | 219/121 LM |
| 3,756,799 | 9/1973 | Neuroth | 65/18 |
| 3,764,776 | 10/1973 | Hierholzer | 219/121 LM |
| 3,839,005 | 10/1974 | Meyer | 65/112 |
| 3,944,640 | 3/1976 | Haggerty et al. | 264/25 |
| 4,025,328 | 5/1977 | Polaert et al. | 65/111 |
| 4,146,380 | 3/1979 | Caffarella et al. | 65/112 X |
| 4,170,726 | 10/1979 | Okuda | 219/121 LF |

*Primary Examiner*—Arthur D. Kellogg
*Attorney, Agent, or Firm*—Senniger, Powers, Leavitt and Roedel

[57] ABSTRACT

A method for imparting increased mechanical strength to a glass object having imperfections in a surface thereof. The glass object is heated to a temperature above the strain point of the glass. A laser beam is generated having a wavelength absorbable by the glass and impinged on all portions of the surface containing the imperfections. The power density at which the beam is impinged is sufficient to rapidly heat a surface stratum of the glass to establish a thermal gradient therein whereby the viscosity at a depth from the surface sufficient to encompass the imperfections is low enough that the stress induced by the surface tension of the glass at the sites of the imperfections is sufficient to cause flow of glass and effect a reforming of the glass surface at said sites.

29 Claims, 7 Drawing Figures

LASER TREATMENT METHOD FOR IMPARTING INCREASED MECHANICAL STRENGTH TO GLASS OBJECTS

BACKGROUND OF THE INVENTION

This invention relates to the field of treatment of glass objects for increasing the mechanical strength thereof and, more particularly, to a novel method for increasing service strength through the reforming of surface defects or flaws.

In order to promote safety and serviceability, extensive research has been devoted to the objective of increasing the strength of glass objects, and most especially, their resistance to damage and failure under conditions of practical usage and handling. Since glass is widely used in packaging, particularly in containers for beverages, including carbonated beverages, much of the research has been devoted to strengthening techniques adapted to the configuration, service and handling conditions encountered with glass containers.

It has long been recognized that glass is intrinsically a very strong material. Based on the energy of the Si-O bond, the theoretical intrinsic strength of silica glass has been estimated at 2,000,000 psi or greater. Because of the effect of surface imperfections, however, the nominal tensile strength of annealed glass is commonly only about 7,000 psi. Such surface defects act as stress multipliers which can raise a nominally applied stress, such as 7,000 psi, to sufficiently high levels at flaw sites to cause fracture initiation of the glass structure. Once fracture is initiated, it can propagate catastrophically through the glass structure because glass is a brittle material and high local stresses are not relieved by plastic flow.

Work in the field of the mechanics of glass structures has established that glass fracture initiation starts almost exclusively at surface defects. The characteristics of these defects, including their geometry, depth of penetration, orientation relative to the surface, etc. determine the extent to which they magnify an average applied tensile stress. Because glass is known to fail under tensile stress, the extent of magnification of applied stress largely determines the observed nominal strength of a glass object.

In order to increase the mechanical service strength of glass objects to a higher proportion of the theoretical strength, two basic avenues have conventionally been pursued. One approach is to attempt the production of glass objects having minimal surface defects, or with defects of a type which cause the least magnification of nominal applied tensile stresses. According to this approach, very high strength levels have been achieved by the application of chemical reagents or solvents to remove from the object the surface margin which contains the flaws, defects and other imperfections. Tensile strength levels up to several hundred thousand psi have been reported with this approach using a number of reagents, most commonly HF solutions. However, a major limitation of this approach arises from its low productivity and high cost. In order to achieve the desired strength improvement it may be necessary to remove as much as 2 mils of glass. The hazards of working with potent chemical reagents such as HF and the problems of disposal thereof are further deterrents to the practical commercial implementation of this approach.

The second major approach to improving the service strength of glass objects is to create residual compressive stress in the surface zone or skin of the glass. The purpose of such a residual compression zone is to place the imperfections under compression. In such circumstance, the defects can initiate fracture only when they are subjected to sufficient levels of tensile stress to overcome the residual compressive stress and reach the tensile stress levels at which fracture propagation can occur. The net practical effect is that the observed service tensile strength of the glass is increased by the magnitude of the residual compressive stress.

There are a number of known techniques for creating residual compressive stress in glass. Among the most practical are thermal tempering, application of case glass, and strengthening by ion exchange. Thermal tempering is normally effective only on thicknesses greater than about $\frac{1}{8}$ inch, making it suitable for some applications but not satisfactory for the strengthening of glass objects such as containers for carbonated beverages. Tempering is an especially unpromising alternative for beverage bottles since the industry is continuing to move in the direction of lighter weight non-returnable bottles. In the case glass method, a layer of glass is bonded to a surface of a glass object to provide a region that is under residual compressive stress. Such an approach is complicated and expensive, and not well adapted to mass production operations such as the manufacture of glass beverage bottles.

One of the more attractive alternatives for providing a layer of residual compressive stress is ion exchange. In accordance with this technique the outer margin of the glass is reacted with a salt whose cations have ionic diameters different from the principal cations of the glass. Where the ion exchange salt contains larger cations, the compressive stress is directly produced and the process is referred to as ion stuffing. Where smaller diameter cations are used, a marginal stratum is generated having a lower coefficient of thermal expansion than the bulk of the glass so that, on cooling from the temperature at which the exchange reaction is conducted, the outer margin is placed under compressive stress.

Despite its demonstrated effectiveness, the ion exchange process has not found widespread application in the manufacture of beverage bottles. The major problem is the handling of the ion exchange salt. This material must be applied to the outside of the container in a molten bath, an aqueous solution spray, or as an air conveyed dust. Each of these techniques involves significant capital investment, operating and maintenance costs. Additionally, residual ion exchange material and ion exchange reaction products adhere to the outside of the container or other glass object after the reaction step is complete. This material must be removed in a separate washing step, and either discarded or recovered and recycled for treatment of additional glass. Such recovery and recycle facilities add to the expense. Also even where a recycle operation is carried out, a purge stream is required to dispose of products of the ion exchange reaction. This brings environmental considerations into play and may require further expense for disposal facilities.

An unfulfilled need has remained in the art, therefore, for an improved method for the clean, economical production of high service strength glass objects, most particularly glass bottles.

SUMMARY OF THE INVENTION

Among the several objects of the present invention, therefore, may be noted the provision of an improved method for increasing the mechanical strength of glass objects; the provision of such a method which can be carried out at high productivity and relatively low processing costs; the provision of such a method which requires no post-treatment step to clean the strengthened object nor to recover and recycle treatment materials; the provision of such a method which requires no chemical reactants; the provision of such a method which requires no recycle of processing material; the provision of such a method which is applicable to improving the strength of glass containers; the provision of such a method which may be used to treat and increase the mechanical strength of glass containers having either thick or thin walls; the provision of such a method which is amenable to process automation and precise control; and the provision of such a method which can be carried out with relatively low overall energy consumption.

Briefly, therefore, the present invention is directed to a novel method for imparting increased mechanical strength to a glass object having imperfections on the surface thereof. In the method, the object is heated to a temperature above the strain point of the glass. A laser beam is generated having a wavelength absorbable by the glass. The beam is impinged on all portions of the surface containing the imperfections at a power density sufficiently to rapidly heat a surface stratum of the glass to establish a thermal gradient therein whereby the viscosity at a depth from the surface sufficient to encompass the imperfections is low enough that the stress induced by the surface tension of the glass at the sites of the imperfections is sufficient to cause flow of the glass and thus effect a reforming of the glass surface at such sites.

Other objects and features will be in part apparent and in part pointed out hereinafter.

BRIEF DESCRIPTION OF THE DRAWINGS

Corresponding reference numerals indicate corresponding parts in the several views of the drawings.

DESCRIPTION OF THE PREFERRED EMBODIMENTS

In accordance with the present invention, it has been discovered that the mechanical service strength of glass objects can be materially enhanced by reforming an outer surface thereof through controlled laser treatment to eliminate imperfections in such surface. The method of the invention is applicable to the strengthening of various glass objects including solid rods and glass containers. It is particularly advantageous for the treatment of carbonated beverage bottles, which require substantial strength for containment of carbonated liquids at pressures as high as 50 psig. By reforming the glass surface to minimize imperfections and substantially increase glass tensile strength under service conditions, implementation of the method of the invention is expected to permit the production of extra light weight non-returnable beverage bottles which safely contain carbonated beverages under conditions of usage and handling.

By impinging a laser beam on a portion of a glass surface containing imperfections, a surface stratum of the glass is rapidly heated by absorption of energy at the high power density realized in a laser beam. A thermal gradient is established in the surface stratum with a corresponding viscosity gradient in inverse relation to the temperature gradient. The surface stratum is heated sufficiently that the viscosity at a depth from the surface sufficient to encompass the surface imperfections is low enough that the stress induced by the surface tension of the glass of the sites of the imperfections is sufficient to cause flow of the glass and effect reforming of the glass surface at those sites.

In order to prevent deformation or fracture of the glass object due to thermal stresses generated by laser heating of the surface stratum, the entire object is heated prior to impingement of the laser beam on the surface thereof. The object must be heated to at least the strain point of the glass, i.e., the temperature at which the viscosity is 1014.7, which for conventional soda/lime glass is approximately 907° F. Preferably, the glass object is preheated to the annealing range, defined as a viscosity of at least about 1013 poise, which is reached at approximately 1000° F. for soda/lime glass.

As a result of the high energy flux provided by the laser, rapid localized heating is obtained wherein the marginal stratum is heated to temperature ranges in which the glass viscosity is reduced sufficiently to effect reforming. The utility of this method is in marked contrast to more conventional methods of heating such as, for example, flame polishing. Although the temperatures achieved in a flame are high enough to reduce the glass viscosity, the energy fluxes are not adequate for practical reforming of the imperfections in glass surfaces. Because heat diffusion within the glass occurs at a rate significant by comparison to the heat input at the glass surface, heating of a glass surface by flame polishing is slow, energy consumption is high, and it is difficult to heat the surface stratum to a temperature range effective for reforming without heating the bulk of the glass object to a temperature at which deformation occurs. By contrast, reforming of a glass surface in accordance with the method of the invention rapidly creates a steep temperature gradient in the surface stratum of the glass so that flow-inducing viscosities do not extend to a depth of more than about 150 $\mu$m from the glass surface. Accordingly, the heat absorbed by the glass is concentrated in the zone in which the imperfections exist and the overall energy requirements of the process are relatively low. Moreover, the steep temperature gradient, which preserves the bulk of the glass object at relatively low temperatures, assists in preventing deformation of the object during the surface reforming process.

To avoid excessive heating of the glass object by the high energy density laser, it is necessary that exposure of any given portion of the glass surface be short and that it be carefully controlled. Short exposure is necessary to achieve the objective of avoiding bulk deformation of the object due to penetration of flow inducing viscosities beyond the thin surface stratum necessary to achieve reformation of the imperfections therein. Short exposure is also essential to both minimize energy consumption and avoid deformation of the glass surface resulting from excessive surface temperatures. In order to achieve short, controlled, uniform exposure of all portions of the glass surface to the laser, it is preferred that the surface be rapidly and systematically scanned with the laser beam.

Figure 1:
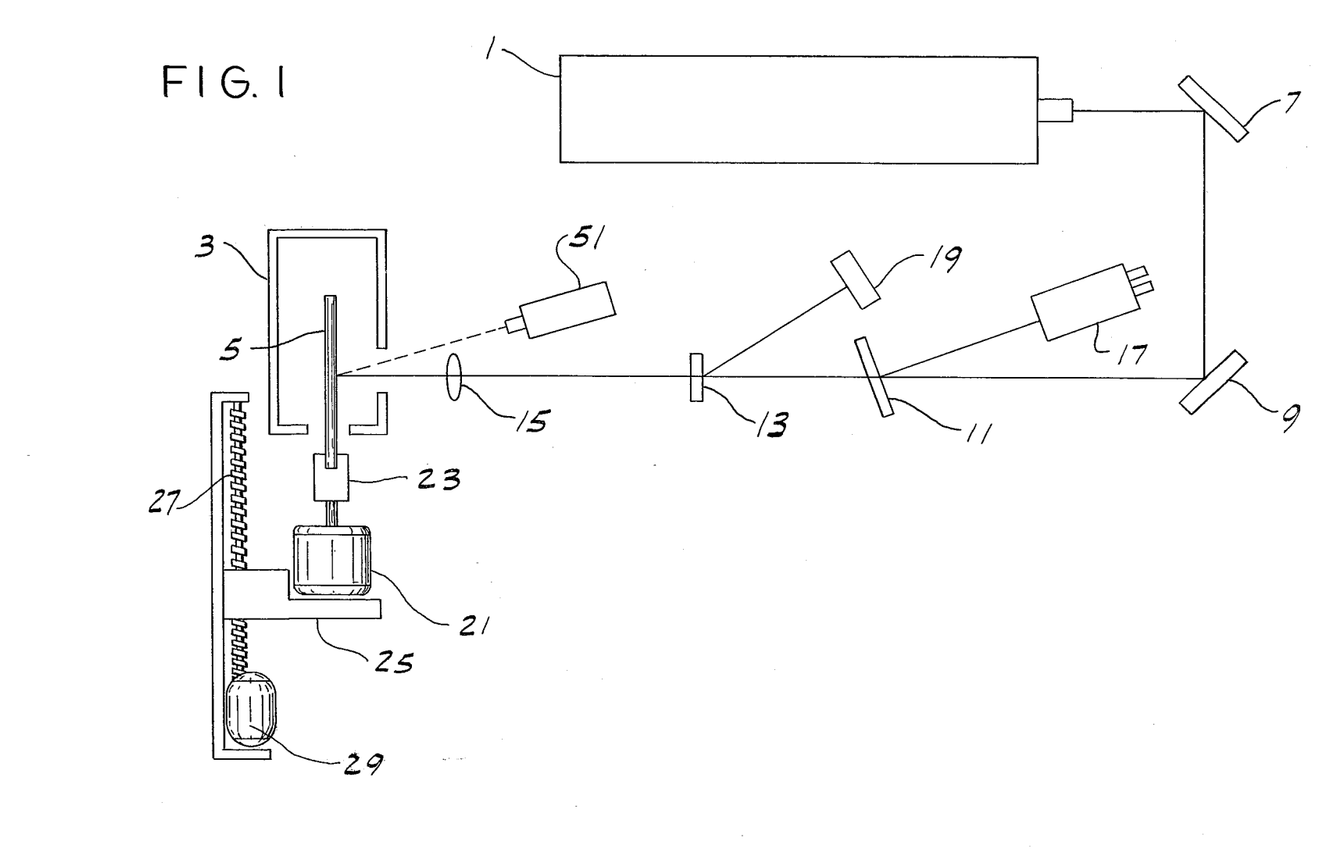
FIG. 1 is a schematic drawing of an apparatus useful in carrying out the method of the invention.

An apparatus suitable for carrying out the method of the invention is schematically illustrated in FIG. 1. Shown at 1 is a continuous $CO_2$ laser which generates a laser beam at a wavelength of approximately 10.6 $\mu$m. Contained within a furnace 3 is a glass object 5 to which the beam is delivered through an optical train which includes beam steering mirrors 7 and 9, sodium chloride flat 11, reflective shutter 13 and germanium lens focusing optic 15. Flat 11 serves to reflect a small defined fraction of the laser beam to an absorbing plate power meter 17. Reflective shutter plate 13 is operated by a solenoid (not shown) and is opened to permit the beam to pass through focusing optic 15 and impinge on the surface of glass object 5 during the glass strengthening operation. When laser 1 is in operation but it is desired to interrupt the passage of the beam into furnace 3, the solenoid is operated to close reflective shutter 13 which then reflects the entire beam into a graphite beam dump 19. The position of lens 15 may be varied along the beam path to vary the size of the heated spot formed by impingement of the beam on the surface of object 5. In order to provide for scanning of object 5 by rotation and translation thereof relative to the laser beam, the object is mounted on the shaft of a variable speed motor 21 through a collet chuck 23, and motor 21 in turn is mounted on a carriage 25 which is movable on a lead screw 27 driven by another variable speed motor 29. Electronic control units (not shown) allow motors 21 and 29 to be driven at preset fixed speeds and provide fast closed loop speed control to compensate for torque fluctuations. The shaft of motor 21 is coaxially aligned with the vertical centerline of the furnace so that object 5 can be translated along the furnace centerline by operation of motor 29 to move carriage 25 along lead screw 27. To provide the proper dwell time for exposure of each portion of object 5 to the stationary beam emanating from focusing optic 15, rotational rates up to 3,000 rpm and translation rates up to 5 cm/sec. are provided by the motor carriage and lead screw assembly.

Figure 2:
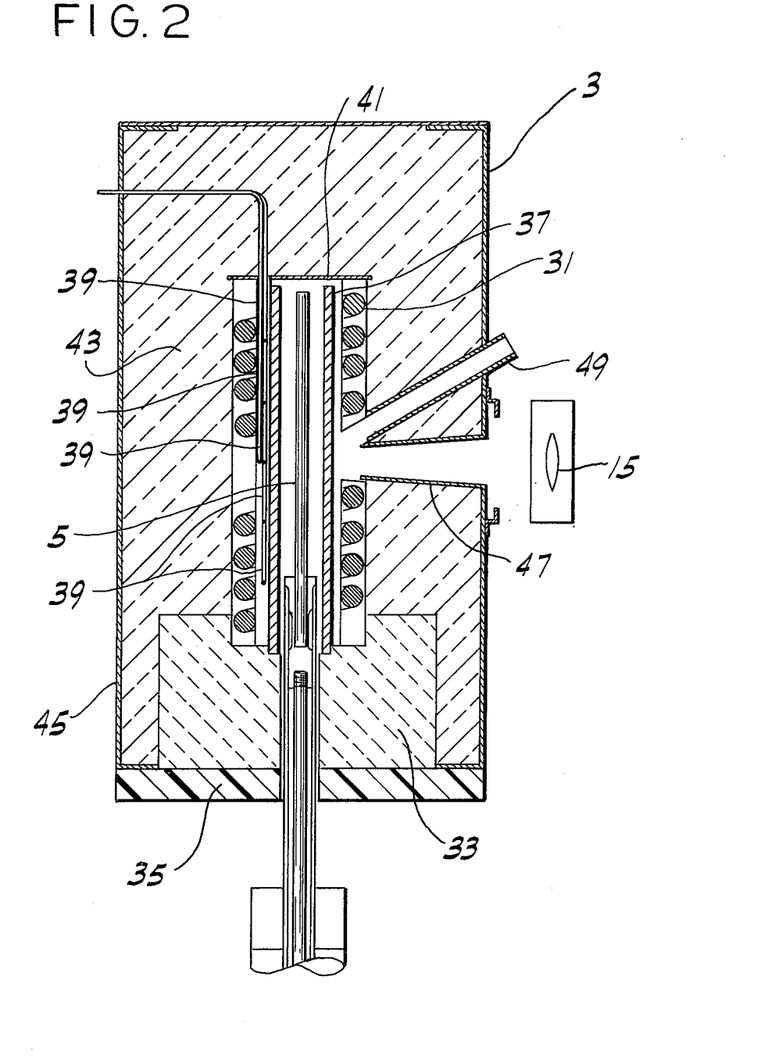
FIG. 2 shows the construction of a furnace useful as a part of the apparatus of FIG. 1.

As shown in FIG. 2, furnace 3 is adapted to both preheat object 5 prior to the impingement of the laser beam thereon and maintain the bulk of the object at a temperature above the strain point during scanning of the object surface by the beam. Furnace 3 includes a Ni-Chrome heating coil 31 supported on an insulating brick 33 that is in turn supported on a transite base 35. Inside of coil 31 and also supported on brick 33 is a stainless steel tube 37 within which object 5 is contained. In an annular space between tube 37 and heating element 31 thermocouples 39 are disposed for measuring temperature at various points within the furnace. Stainless steel cover 41 serves as a cap on both heating element 31 and tube 37. The heating element is contained within packed fiberfrax insulation 43 and the entire assembly is enclosed by a metal housing 45. Access of the beam from optic 15 to object 5 is provided by a conical channel 47 in the furnace wall. Another channel 49 serves as both a visual observation port and as a site line for measuring the temperature of the surface on which the laser beam impinges using an optical pyrometer 51 (see FIG. 1).

Using the apparatus illustrated in FIGS. 1 and 2, the entire lateral surface of object 5 may be scanned by the fixed laser beam. By adjustment of the beam size, rotational velocity and translational velocity, all portions of the lateral surface of the object may be heated to a substantially uniform maximum temperature for the reforming of the entire surface. In order to assure that the maximum temperature reached at all portions of the surfaces is as uniform as possible, these parameters may be adjusted so that the surface on which the beam impinges overlaps in successive rotations of the object.

Figures 3, 5:
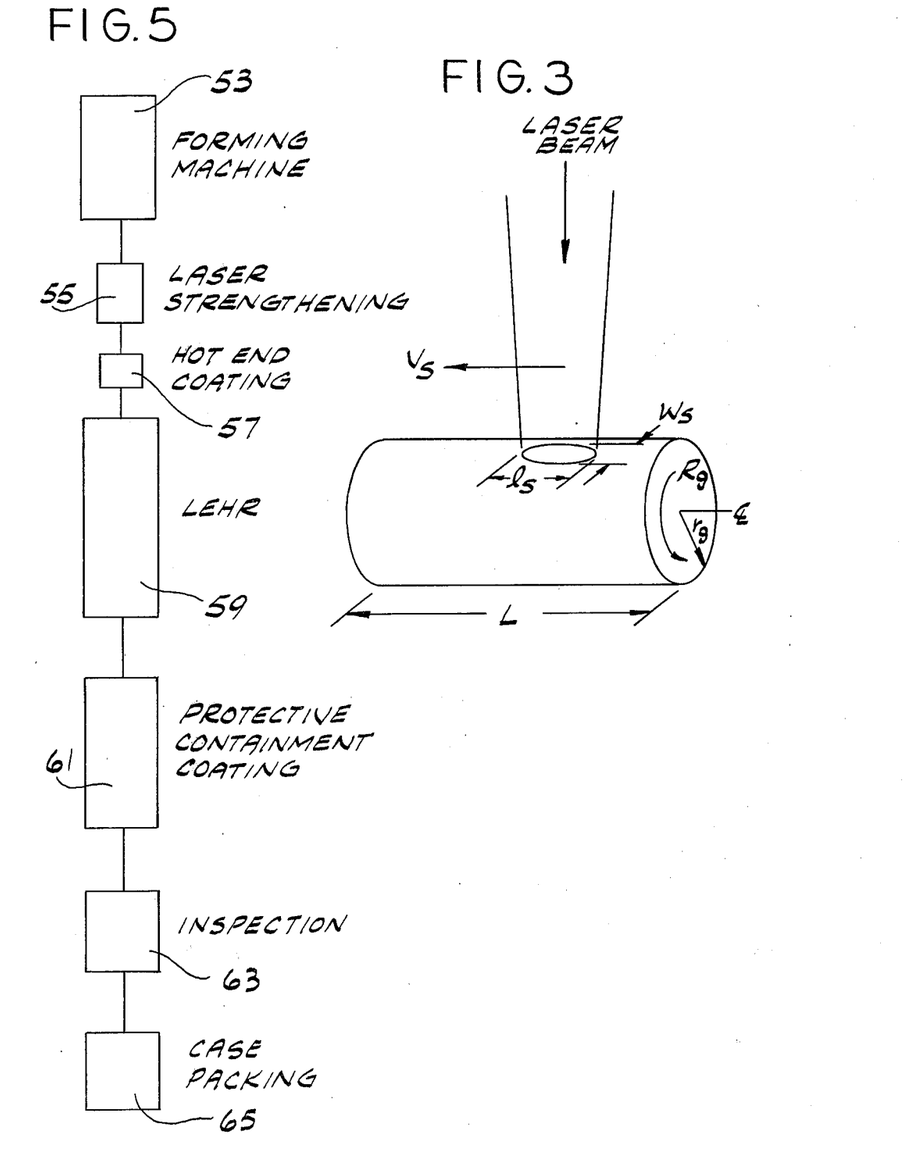
FIG. 3 is a schematic drawing illustrating the processing geometry utilized in the method of the invention where a fixed laser is scanned over a glass object which is subjected to simultaneous rotation and translation.
FIG. 5 is a block flow diagram illustrating a preferred alternative for integrating laser strengthening into a glass bottle manufacturing line.

Illustrated in FIG. 3 is the geometry of impingement of a laser beam on a rod subjected to laser strengthening in accordance with the method of the invention. As illustrated in the drawing, the laser beam is incident on a rotating glass rod of radius $r_g$ and length L in a manner that produces an irradiance area of length $l_s$ (axial direction) and $w_s$ (rotational direction). The spot dimensions are determined by the characteristics of the focusing optic, the beam incidence angle and the lens to surface distance. For a simple lens and normal incidence, $w_s$ equals $l_s$ and the spot degenerates to a circle, as shown.

As noted above, the object of laser treatment is to produce a transient temperature rise in a thin surface stratum so that, at a depth d inside the surface sufficient to encompass the imperfections therein, the temperature is raised to a point at which the viscosity is low enough to permit flow of glass under the influence of surface tension. For any particular glass object, there is an optimum value for d because it must be thick enough to properly cure defects, but not so thick as to waste energy. To minimize energy loss, it is also desirable that the wavelength of energy emitted by the laser be absorbable by the glass so that optical penetration is minimal, the surface is rapidly heated to the maximum of the thermal gradient induced in the stratum, and the stratum beyond the range of optical penetration is heated by thermal diffusion. In order to provide effective control and minimum energy consumption, it is preferred that the optical penetration be not more than about 10 $\mu$m which, for conventional soda/lime glass, is achievable at wavelengths in the range of 5 to 12 $\mu$m. A conventional $CO_2$ laser is particularly suitable for use in the process of the invention because it provides electromagnetic energy at a wavelength of approximately 10.6 $\mu$m and is relatively energy efficient.

From the fact that the time required to reach a given temperature at a given depth through thermal diffusion is directly proportional to the ratio $d^2/K$ where K is the thermal diffusivity of the glass, the requisite dwell time of the laser beam on any portion of the glass to heat the marginal stratum to flow viscosity at a given depth can be calculated from the depth specified and the energy flux of the laser. Generally, laser power intensity in the focused beam should be at least about 500 W/cm$^2$ while a power intensity of more than 50,000 W/cm$^2$ should be avoided in order to prevent deformation of the surface of the glass object. A range of 2000 to 10,000 W/cm$^2$ is normally preferred. Based on this range of intensity, and any variation in the depth to which the surface stratum is heated to flow viscosity, a fairly wide range of dwell times and corresponding unit energy requirements may be appropriate. This further depends on the particular substrate and the condition of its surface. The latter factor in particular has a bearing on the depth to which attainment of flow viscosity is sought. Total unit energy requirements may vary from 1–100 J/cm$^2$, most typically 15–60 J/cm$^2$ based on surface conditions and power intensity. For power density of 5000 w/cm$^2$, the requisite dwell time ranges from 0.2 milliseconds (1.0 J/cm$^2$), for a heating depth of about 10 μm, to 20 milliseconds (100 J/cm$^2$) for a depth of 150 μm. These dwell times may be ratioed upwardly and downwardly in inverse proportion to changes in the energy density. The optimum dwell time for a given laser and glass surface condition can be readily determined by routine calculation and experimentation.

As a practical matter, scanning of the object is most conveniently carried out where there is a high ratio of circumferential to translational velocity, i.e., the object is rotated much more rapidly than it is translated along the furnace centerline. In these circumstances, the dwell time is substantially entirely governed by the circumferential velocity, and the controlling dimension of the beam spot impinged on the glass surface is the dimension extending in the direction of circumferential movement. To maximize productivity, it is desirable to utilize a focusing optic which projects a beam of elongate configuration with its short dimension in the direction of circumferential movement and its long dimension in the direction of translational movement of the object during scanning. By having a beam of relatively extensive dimension in the translational direction, translation can progress rapidly and the entire bottle be scanned in a small number of turns. In a particularly preferred embodiment adapted for processing large volumes of glass objects, a laser and focusing optic may be used which projects an elongate longitudinal beam of substantially uniform intensity extending the entire length of the object. Such a beam may be used to process an object in a single turn.

In those instances where the beam is of short length relative to the object, and especially where its intensity is not evenly distributed (as in the typical Gaussian distribution of intensity decreasing from the beam center), it is desirable that the path on the surface upon which the beam impinges overlaps in successive rotations so that the surface is heated to a substantially uniform maximum temperature for the reforming thereof. The percent overlap may vary fairly widely, for example, in a range of 5 to 70%. For a circular or nearly circular beam, an overlap in the range of approximately 20% is quite convenient. For a more elongate beam, the proportional extent of overlap can be reduced, with a further contribution to scanning rate and productivity.

Although the exact relationship between depth and viscosity necessary to encompass an imperfection of given depth is not precisely known, it is generally desirable that the stratum be heated to a temperature gradient such that the viscosity be reduced to no more than about 105 poises at a depth closely approximate to the depth to which the imperfections extend. Generally, this depth is at least about 10 μm and more typically 50 to 100 μm. In order to minimize energy consumption and deformation of the glass, however, the gradient should be such that the glass remains at a temperature low enough to resist flow beyond a stratum having a thickness no greater than about 150 μm inside the surface.

In order to achieve the desired viscosity at a depth encompassing the imperfections, the temperature at such depth should be typically at least about 900° C. Where the temperature gradient is steep enough to meet the preferred criteria for operation of the method of the invention, achievement of the requisite viscosity at the necessary depth requires a surface temperature in the range of approximately 1200° C. and thus a surface viscosity no greater than about 103.5 poises.

To maximize power intensity, it is preferred that the angle of incidence of the beam to the bottle surface be normal. Processing factors may require some deviation from the normal and satisfactory results can be achieved at a beam incidence angle as much as 45° from the normal, provided that other processing parameters are controlled to maintain the requisite viscosity at a depth adquate to encompass the imperfections in the glass surface. Variations in beam incidence angle may have some utility in providing a relatively elongate beam spot which can contribute to increased scanning rates, provided that the laser power is great enough that the loss in beam intensity associated with the oblique angle of incidence does not interfere with the effectiveness of heating the surface stratum.

As noted above, the method of the invention is advantageously suited for use in producing light weight carbonated beverage bottles of greatly improved strength, in particular burst resistance. Illustrated in FIG. 5 is a glass bottle manufacturing line into which the laser treatment strengthening method of the invention is incorporated. In this processing scheme, bottles leaving the forming machine 53 pass through a laser strengthening operation 55 after which they receive a hot end coating at a coating station 57. Alternatively, the hot end coating might be applied before laser treatment. It is believed that application of conventional tin oxide or titanium oxide hot end coatings may adequately preserve the surfaces of laser strengthened glass beverage bottles against abrasion so as to maintain the increased mechanical service strength through filling, shipping and handling conditions. After receipt of the hot end coating, the bottles pass through a conventional lehr 59 and may optionally be provided with a plastic containment coating at a coating station 61. Such a plastic containment coating is most effective for protecting the reformed glass surface against abrasion and thereby preserving it from the formation of additional imperfections. But for some products its cost may not be justified given the protection achievable by simple application of tin oxide or titanium oxide hot end coating. Whether provided with a containment coating or not, the bottles are inspected at an inspection station 63 and packed in a case packing operation 65. As an alternative, the bottles may be passed through the lehr first and then subjected to laser strengthening while still at annealing temperature. As a still further alternative, finished and warehoused bottles may be reheated and strengthened by laser treatment, optionally followed by plastic containment coating immediately prior to shipment.

The following examples illustrate the invention.

EXAMPLE 1

An apparatus of the type illustrated in FIGS. 1 and 2 was set up for the purpose of subjecting glass rods to laser treatment. The laser used was a Hadron Model 1020 (25 W) continuous $CO_2$ laser, the power meter was a Scientech Model 3600 and the lens was a germanium meniscus lens having a 10 cm. focal length. Both motors 21 and 29 were Motomatic model E650MG motors. The system was set up so that rotational rates up to 3000 rpm and translation rates up to 5 cm. per second could be achieved.

To identify and establish the desired conditions for laser treatment, laser 1 was turned on and allowed to stabilize, after which the beam alignment was checked. Laser beam spot size was then determined at various distances from the lens by taking burn impressions in acrylic plastic. Based on these measurements, the lens was placed so that the beam interaction on the surface would be about 1 mm in diameter.

Furnace 3 was preheated to a desired preheat temperature. A 5 mm diameter glass rod was mounted in collet 23 on the shaft of motor 21 and its angular position adjusted to minimize run out. The desired rotational speed of the rod was set on the controller for motor 21 and checked with a stroboscope. The rod was then translated into the preheated furnace and maintained there for 10 minutes to allow the glass temperature to equilibrate. The laser beam was pulsed on the rotating glass for 1 sec. to make visual verification of beam alignment. After beam alignment was confirmed, beam shutter 13 was opened and rod translation was initiated downward, i.e., towards the furnace opening. After the lateral surface of a 5 cm. length of glass had been processed, the laser beam shutter was closed and the glass rod removed for cooling and testing.

In the laser treatment of glass rods, preheat temperature ranged from 1012° to 1021° F. for a time of ten minutes; spot configuration was circular; spot size ranged from 0.8 to 1.5 mm diameter, rod rotation ranged from 10 to 600 rpm; rod translation rate ranged from 0.07 to 0.63 cm./sec.; laser power ranged from 16.5 to 23.1 W; energy density ranged from 17.1 to 167.4 $J/cm^2$; and percent overlap ranged from none to 84%.

The laser treated rods were subjected to a standard four point bend test and the nominal fracture stress in psi was observed. To provide a basis for comparison, untreated rods were subjected to the same test, as were rods which had been subjected to comparable preheat conditions in the furnace but no laser treatment. The processing conditions and nominal fracture stress for the rods of this example are set forth in Table 1, together with an indication of the increase in nominal fracture stress of the laser treated rods as compared to the as-received control rods and the thermally treated control rods.

TABLE I.

SUMMARY OF INITIAL EXPERIMENTS ON LASER STRENGTHENING OF GLASS RODS

| Laser Treated Rods | Rod Preheat Oven Temp. F. | Rod Preheat Time in Oven min. | Spot Size mm | Rod Rotation Rate rpm | Rod Translation Rate cm/sec | Laser Power Watts | Average Energy Density* $J/cm^2$ | Overlap Percent | Nominal Fracture Stress from 4-Point Bend Tests, psi | % Higher Nominal Fracture Stress of Laser Processed Rods vs. As-Received Controls | % Higher Nominal Fracture Stress of Laser Processed Rods vs. Thermal Controls |
|---|---|---|---|---|---|---|---|---|---|---|---|
| 5-1 | 1020 | 10 | 0.8 | 600 | 0.42 | 16.5 | 25.0 | 47 | 32,950 | 49.9 | 65.4 |
| 5-2 | 1020 | 10 | 0.8 | 600 | 0.13 | 19.8 | 99.0 | 84 | 25,190 | 14.6 | 26.5 |
| 6-1 | 1020 | 10 | 0.8 | 600 | 0.63 | 18.3 | 18.5 | 21 | 50,070 | 128. | 151. |
| 6-3 | 1016 | 10 | 0.8 | 600 | 0.63 | 18.3 | 18.5 | 21 | 36,180 | 64.6 | 81.6 |
| 6-4 | 1021 | 10 | 0.8 | 600 | 0.63 | 18.9 | 19.1 | 21 | 14,130 | −35.7 | −29.1 |
| 6-2 | 1016 | 10 | 0.8 | 131 | 0.63 | 16.9 | 17.1 | none | 26,320 | 19.8 | 32.1 |
| 6-5 | 1015 | 10 | 0.8 | 300 | 0.32 | 18.9 | 37.6 | 20 | 28,260 | 28.6 | 41.9 |
| 6-6 | 1015 | 10 | 0.8 | 300 | 0.32 | 23.1 | 45.9 | 20 | 38,280 | 74.2 | 92.2 |
| 6-7 | 1016 | 10 | 0.8 | 300 | 0.32 | 22.4 | 44.6 | 20 | 36,660 | 66.8 | 84.0 |
| 6-8 | 1016 | 10 | 0.8 | 150 | 0.18 | 19.1 | 67.6 | 10 | 27,290 | 24.2 | 37.0 |
| 6-9 | 1015 | 10 | 1.5 | 50 | 0.18 | 20.2 | 71.4 | none | 34,390 | 56.5 | 72.6 |
| 6-10 | 1011 | 10 | 1.5 | 50 | 0.18 | 18.5 | 65.4 | none | 44,250 | 101. | 122. |
| 6-11 | 1013 | 10 | 1.5 | 50 | 0.18 | 18.5 | 65.4 | none | 42,640 | 94.0 | 114. |
| 6-12 | 1011 | 10 | 1.5 | 15 | 0.07 | 18.4 | 167.4 | none | 38,760 | 76.3 | 92.7 |
| 6-13 | 1012 | 10 | 1.5 | 10 | 0.32 | 18.6 | 37.1 | none | 17,440 | −20.7 | −12.4 |
| As-Received Controls 35166-9- (1 thru 8) | none | | | none | | | | | 21,980 (average for the (8) rods) | — | — |
| Thermal Controls 35166-8- (1 thru 6) | 1020 F. to 1024 F. | 10 | | none | | | | | 19,920 (average for the (6) rods) | — | — |

*Incident energy density.

EXAMPLE 2

Based on the results observed in Example 1, additional 5 mm diameter rods were subjected to laser treatment with the same apparatus that was used in Example 1. Again the laser treated rods were subjected to the four point bend test and nominal fracture stress observed. To provide a basis for comparison, the bend tests were also conducted on two sets of control rods, one in the as-received condition with no treatment of any type and the other subjected to the preheat conditions but not to the laser treatment.

In one of the runs of this example i.e., 29-(1,3-5) an eliptical spot 0.5×2 mm was used in place of a circular spot.

The processing conditions and bend test results for the runs of this example are set forth in Table II.

cessing. In one set of tests, four rods were subjected to circumferential abrasion with 320 grit abrasive paper and in another four runs the rods were subjected to circumferential abrasion using 240 grit abrasive paper. In each instance, the rod was individually abraded by

TABLE II.
SUMMARY OF AVERAGE STRENGTH DATA FOR LASER STRENGTHENING OF GLASS RODS

| Test Rod Number | Pre-Processing Rod Treatments | | Rod Laser Processing Conditions | | | | | | | Average Nominal Fracture Stress, psi | Strength Increase of Laser Processed Rods Versus Indicated "Controls", Percent | | |
|---|---|---|---|---|---|---|---|---|---|---|---|---|---|
| | Ab-rasion | Pre-heat To (1020–1030)F. | Spot Size, mm | Rod Rota-tion Rate, rpm | Rod Trans-lation Rate, cm/sec | Laser Power W | Average Energy Density,* J/cm² | Spot Overlap, Percent | Number of Rods In Test Sets | | As-Received Controls | Pre-heat Controls | A-braded And Pre-heat Controls |
| (As-Received Controls) 9-(1-8); 24-(1-5) | None | None | | | None | | | | 13 | 21,900 | — | — | — |
| (Preheat Controls) 8-(1-6) | " | Yes | | | " | | | | 6 | 19,900 | — | — | — |
| 18-(8-11) | " | " | 0.8 | 1200 | 1.21 | 21.8 | 11.5 | 24 | 4 | 20,300 | −7% | +2% | — |
| 18-(12-16) | " | " | 0.8 | 900 | 0.94 | 22.3 | 15.1 | 22 | 5 | 32,000 | +46 | +61 | — |
| 6-(1,3,4); 18-(1-5) | " | " | 0.8 | 600 | 0.63 | 21.3 | 21.5 | 21 | 8 | 37,700 | +72 | +89 | — |
| 6-(6,7) | " | " | 0.8 | 300 | 0.32 | 22.8 | 45.4 | 20 | 2 | 37,400 | +71 | +88 | — |
| 11 6-(9-11) | " | " | 1.5 | 50 | 0.18 | 19.1 | 67.4 | None | 3 | 40,400 | +84 | +103 | — |
| 29-(1,3-5) | " | " | 0.5 × 2 | 170 | 0.67 | 21.5 | 20.4 | " | 3 | 29,000 | +32 | +46 | — |

*Incident energy density.

EXAMPLE 3

Using the method and apparatus generally described in Example 1, additional laser treatment runs were carried out on 5 mm diameter rods and bend strength tests conducted on the treated rods. Comparative tests were also conducted on rods which received no treatment and rods which received only thermal treatment in accordance with the same preheat conditions as the laser treated rods. Each of the laser treated and control rods was subjected to severe abrasion prior to any processing silicon carbide abrasive paper against the rod with a constant force as the rod was rotated and slowly translated relative to the abrasive paper. Abrasions were thus created approximately perpendicular to the rod axis along a small spiral path on the rod surface. Such orientation approximates the maximum effectiveness for reducing the strength of rods by treatment with a given abrasive paper.

Processing conditions and bend test results for the rods of this example are set forth in Table III.

TABLE III.
SUMMARY OF AVERAGE STRENGTH DATA FOR LASER STRENGTHENING OF GLASS RODS

| Test Rod Number | Pre-Processing Rod Treatments | | Rod Laser Processing Conditions | | | | | | | Average Nominal Fracture Stress, psi | Increase of Laser Processed Rods Versus Indicated "Controls", Percent | | |
|---|---|---|---|---|---|---|---|---|---|---|---|---|---|
| | Ab-rasion | Pre-heat To (1020–1030)F. | Spot Size, mm | Rod Rota-tion Rate, rpm | Rod Trans-lation Rate, cm/sec | Laser Power W | Average Energy Density,* J/cm² | Spot Overlap, Percent | Number of Rods In Test Sets | | As-Received Controls | Pre-heat Controls | A-braded And Pre-heat Controls |
| (As-Received Controls) 9-(1-8); 24-(1-5) | None | None | | | None | | | | 13 | 21,900 | — | — | — |
| 23-(6-10) | 320 Grit | None | | | None | | | | 5 | 14,100 | −36 | — | — |
| 24-(11-13) | 320 Grit | Yes | | | " | | | | 3 | 16,100 | −26 | — | — |
| 24-(17-19) | 320 Grit | " | 0.8 | 600 | 0.63 | 22.5 | 22.7 | 21 | 3 | 21,400 | −2% | — | +33 |
| 29-(9-11) | 320 Grit | " | 0.8 | 300 | 0.32 | 20.2 | 40.2 | 20 | 3 | 29,600 | +35 | — | +84 |
| 24-(6-10) | 240 Grit | None | | | None | | | | 5 | 12,700 | −42 | — | — |
| 24-(14-16) | 240 Grit | Yes | | | " | | | | 3 | 13,400 | −39 | — | — |
| 24-(20-22) | 240 Grit | " | 0.8 | 600 | 0.63 | 20.9 | 21.1 | 21 | 3 | 20,600 | −6 | — | +54 |

TABLE III.-continued

SUMMARY OF AVERAGE STRENGTH DATA FOR LASER STRENGTHENING OF GLASS RODS

| | Pre-Processing Rod Treatments | | Rod Laser Processing Conditions | | | | | | | | Increase of Laser Processed Rods Versus Indicated "Controls", Percent | | |
|---|---|---|---|---|---|---|---|---|---|---|---|---|---|
| Test Rod Number | Abrasion | Preheat To (1020–1030)F. | Spot Size, mm | Rod Rotation Rate, rpm | Rod Translation Rate, cm/sec | Laser Power W | Average Energy Density,* J/cm² | Spot Overlap, Percent | Number of Rods In Test Sets | Average Nominal Fracture Stress, psi | As-Received Controls | Preheat Controls | Abraded And Preheat Controls |
| 29-(12–14) | 240 Grit | " | 0.8 | 300 | 0.32 | 23.5 | 46.8 | 20 | 3 | 24,000 | +10 | — | +79 |

*Incident energy density.

EXAMPLE 4

Glass bottles 1¼ in. in diameter×3 in. tall having a capacity of 1 oz. were subjected to laser treatment using an apparatus of the type generally described in Example 1. The apparatus used for treatment of glass rods was modified to adapt it for processing of objects having the configuration of the glass bottles. Thus, the 1¼ in.×6 in. long heater assembly contained within the furnace was replaced by a 2⅜ in. diameter×8 in. long unit. The furnace access port for the laser beam was modified and insulation rings were added to the translating chuck in order to improve vertical temperature distribution in the enlarged preheat chamber by "sealing" the bottom of the base. An oxidized stainless steel bottle pedestal was used to support the bottle. This pedestal was held in the same translating chuck assembly that had been used for the rods. The bottles were supported on the pedestal in an inverted position for both preheating and laser treatment. Treated hot bottles were grasped on the exterior of the finish by asbestos coated tongs to transport them to a static air chamber for cooling.

After subjection to preheating and laser treatment the treated bottles were subjected to burst tests. For purposes of comparison, burst tests were also run on bottles as received with no treatment, and on bottles which were subjected only to thermal treatment in accordance with the same preheat conditions used for the laser treated bottles.

Before burst testing, all of the bottles, both laser treated and control bottles, were coated with a uniform plastic containment coating. The purpose of the plastic containment coating was to retain the fracture fragments sufficiently that the location of fracture initiation could be determined. Since only the sidewall and sidewall shoulder junction areas of the bottle were treated using the laser treatment system of this example, all burst strength data comparisons were limited to test bottles which failed in those areas. No consideration was given to either treated or untreated bottles which failed in the bottom.

Figure 4:
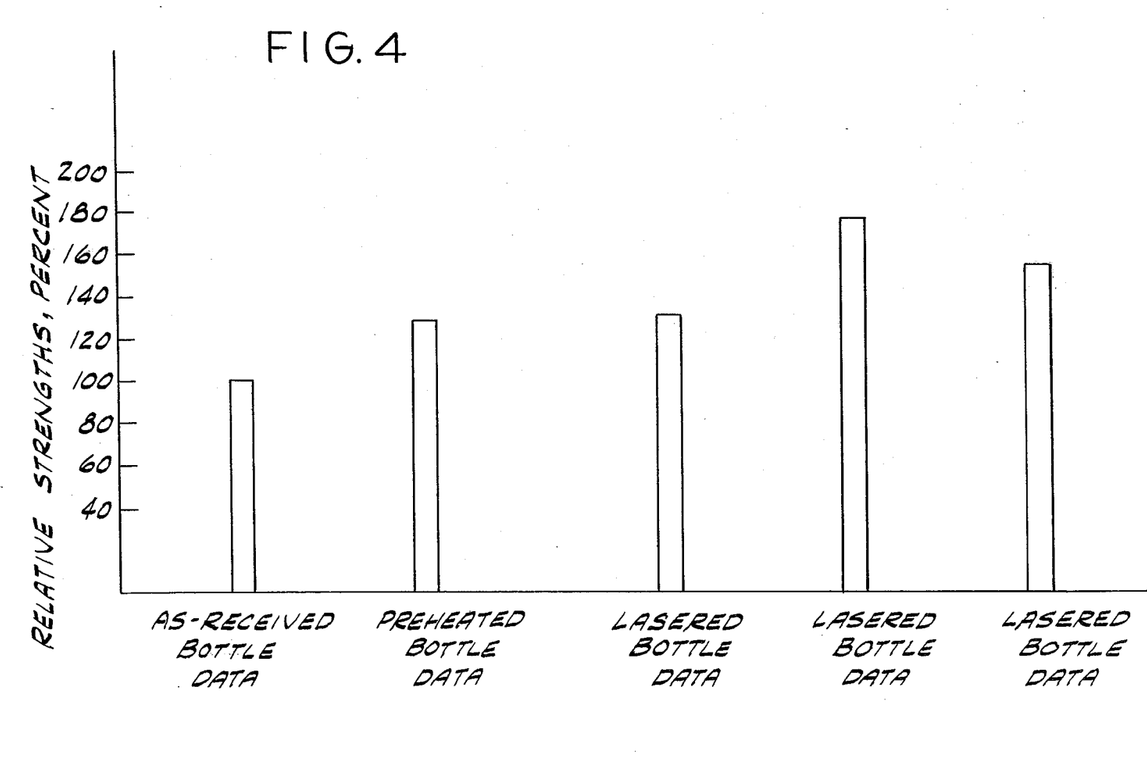
FIG. 4 is a graphic summary of the increase in strength achieved by laser scanning of glass bottles.

Summarized in Table IV are the processing conditions and burst test results for the runs of this example. To provide a visual summary of the effectiveness of laser treatment upon the burst strength of bottles, the data of Table IV are graphically compared in FIG. 4.

TABLE IV.

SUMMARY DATA DEMONSTRATING INCREASES IN THE BURST STRENGTH OF ONE OUNCE CAPACITY BOTTLES FOLLOWING LASER TREATMENT

| Test Bottle No. Designation | Bottle Preheat Temp. F. | Bottle Preheat Time min. | Laser Spot Size mm | Bottle Rotation Rate rpm | Bottle Translation Rate cm/sec. | Laser Power W | Average Energy Density J/cm | Spot Overlap Percent | Bottle[3] Burst Pressure psig Bottles | Percent Strength Increase of Laser Processed Bottle Versus As-Received Bottles | Percent Strength Increase of Laser Processed Bottle Versus Preheated Bottles |
|---|---|---|---|---|---|---|---|---|---|---|---|
| 58-1 | As-received | | "control bottle" | | | | | | 700 | | |
| 58-4 | " | | " | | | | | | 610 | | |
| 58-5 | " | | " | | | | | | 750 | | |
| 58-6 | " | | " | | | | | | 800 | | |
| 58-7 | " | | " | | | | | | 730 | | |
| 58-8 | " | | " | | | | | | 920 | | |
| 58-9 | " | | " | | | | | | 930 | | |
| 58-10 | " | | " | | | | | | 830 | | |
| 58-11 | " | | " | | | | | | 1220 | | |
| | | | | | | | | Average | 840 | — | — |
| 54-1 | 1025 | 11 | | | no laser processing | | | | | | |
| 54-2 | " | " | | | " | | | | 940 | | |
| 54-3 | " | " | | | " | | | | 1220 | | |
| 54-4 | " | " | | | " | | | | 1300 | | |
| 54-5 | " | " | | | " | | | | 810 | | |
| | | | | | | | | Average | 1070 | 27% | — |
| 59-3 | 1025 | 14 | 0.8 | 78 | 0.08 | 18.9 | 23.2 | 23 | 1030 | | |
| 59-4 | " | 11 | 0.8 | 78 | 0.08 | 19.5 | 23.9 | 23 | | | |
| | | | | | | | | Average | 1110 | 32% | 4% |
| 47-6 | 1025 | 11 | 0.8 | 78 | 0.07 | 18.1 | 25.4 | 33 | 1610 | (Finish cracked in efforts to stop leak) | |
| 55-2 | " | 16 | 0.8 | 78 | 0.07 | 18.3 | 25.7 | 33 | 1400 | | |
| 55-5 | " | 11 | 0.8 | 78 | 0.07 | 20.8 | 29.2 | 33 | 1490 | | |
| 55-6 | " | 11 | 0.8 | 78 | 0.07 | 21.6 | 30.3 | 33 | 1440 | | |

TABLE IV.-continued
SUMMARY DATA DEMONSTRATING INCREASES IN THE BURST STRENGTH OF ONE OUNCE CAPACITY BOTTLES FOLLOWING LASER TREATMENT

| Test Bottle No. Designation | Bottle Preheat Temp. °F. | Time min. | Laser Spot Size mm | Bottle Rotation Rate rpm | Bottle Translation Rate cm/sec. | Laser Power W | Average Energy Density J/cm | Spot Overlap Percent | psig | Bottle[3] Burst Pressure Bottles | Percent Strength Increase of Laser Processed Bottle Versus As-Received Bottles | Preheated |
|---|---|---|---|---|---|---|---|---|---|---|---|---|
| | | | | | | | | | Average | 1490 | 77% | 39% |
| 59-5 | 1025 | 11 | 0.8 | 48 | 0.05 | 21.2 | 41.7 | 22 | | 1020 | | |
| 59-8 | " | 11 | 0.8 | 48 | 0.05 | 23.8 | 46.8 | 22 | | 1570 | | |
| | | | | | | | | | Average | 1300 | 55% | 21% |

[1]Bottles were 1 oz. Boston Round Style of flint glass, mold number 1519, finish 20-400 manufactured by Brockway Glass Company.
[2]The temperature of the miniature furnace in which the bottles were preheated and subsequently laset treated.
[3]Because the experimental set-up could only laser-treat the sidewall portion of the bottles, all test data tabulated for control bottles and for laser treated bottles included only those bottles which had fracture initiation in the sidewall area or at the upper sidewall shoulder junction (unless otherwise noted in the table).

EXAMPLE 5

Figure 6:
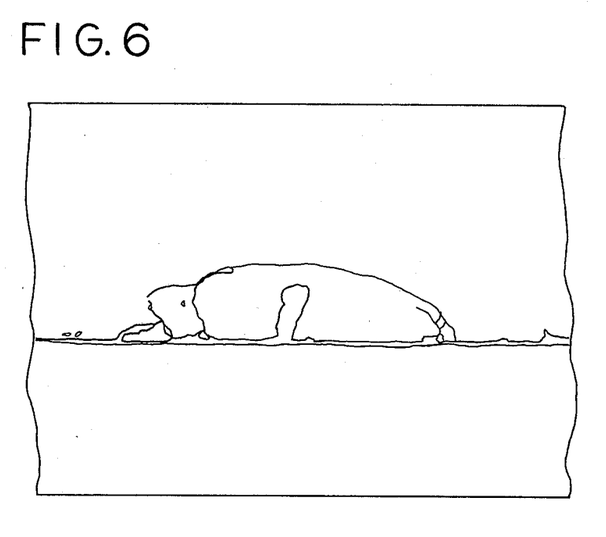
FIG. 6 is a sketch based on a photomicrograph of a longitudinally diametrically sectioned glass rod and supporting plastic oversleeve showing in lateral cross section a crack produced by treatment of the cold rod with a laser beam.

In order to demonstrate the effectiveness of the method of the invention for reforming or healing surface flaws or defects in a glass object, the method was carried out to treat a surface in which gross flaws had been deliberately created. Such gross flaws were produced by scanning a highly focused laser beam over a cold glass surface of an object which had not been preheated. Flaws which were clearly evident in microscopy were thus created by the thermal stresses generated by impingement of the highly focused beam. A helical path of cracked glass was produced on a rod, the depth and conformation of which are illustrated in the longitudinal cross-sectional view of FIG. 6. A quasicontinuous subsurface crack of arcuate cross section was formed, intersecting the glass surface on both sides of the beam path.

Figure 7:
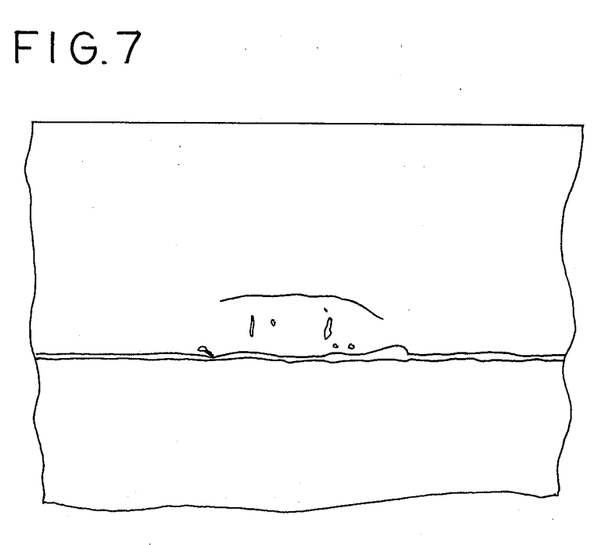
FIG. 7 is a sketch based on a photomicrograph of the rod of FIG. 6 showing in lateral cross section the site of a similar crack after treatment in accordance with the method of the invention.

A similarly flawed glass rod was subjected to laser treatment in accordance with the method of the invention. It was preheated to a temperature of approximately 1000° F. for 10 min. after which it was scanned with the laser beam at an energy intensity of 20 J/cm$^2$, a circular beam spot diameter of 0.8 mm, a translational scanning rate of 0.633 cm./sec. and a rotation rate of 600 rpm. The crack created by scanning the cold glass was almost entirely healed by scanning in accordance with the method of the invention. A typical healed crack is shown in FIG. 7. In this instance the healing effect penetrated at least about 60 μm (~2 mils).

In view of the above, it will be seen that the several objects of the invention are achieved and other advantageous results attained.

As various changes could be made in the above methods without departing from the scope of the invention, It is intended that all matter contained in the above description or shown in the accompanying drawings shall be interpreted as illustrative and not in a limiting sense.

What is claimed is:

1. A method for imparting increased mechanical strength to a glass object having imperfections in a surface thereof, comprising the steps of:
   heating the object to a temperature above the strain point of the glass;
   generating a laser beam having a wavelength absorbable by the glass; and
   impinging said beam on all portions of said surface from which it is desired to remove said imperfections, the power density of said beam being sufficient to rapidly heat a surface stratum of said glass to establish a thermal gradient therein whereby the viscosity at a depth from said surface sufficient to encompass said imperfections is low enough that the stress induced by the surface tension of the glass at the sites of said imperfections is sufficient to cause flow to glass and effect a reforming of the glass surface at said sites, the dwell time of said beam at any particular portion of said surface being limited so that flow inducing viscosities do not extend to a depth beyond a thin surface stratum of the glass.

2. A method as set forth in claim 1 wherein said laser is continuous and the beam is scanned over said surface.

3. A method as seth forth in claim 2 wherein said laser beam is in a fixed position and said object is simultaneously rotated and translated so that an outside surface thereof is entirely scanned by said beam.

4. A method as set forth in claim 3 wherein the path on said surface upon which said beam impinges overlaps in successive rotations so that said surface is heated to a substantially uniform maximum temperature for reforming thereof.

5. A method as set forth in claim 2 wherein the power density of the laser in the beam impinged on said surface is at least about 500 W/cm$^2$.

6. A method as set forth in claim 5 wherein said power density is not greater than about 50,000 W/cm$^2$.

7. A method as set forth in claim 6 wherein said power density is between about 2000 and about 10,000 W/cm$^2$.

8. A method as set forth in claim 5 wherein said laser beam is in a fixed position and said object is simultaneously rotated and translated so that an outside surface thereof is entirely scanned by said beam.

9. A method as set forth in claim 8 wherein the dwell time of said beam on any point of said surface during the scanning thereof is between about 0.2 and about 25 msec.

10. A method as set forth in claim 9 wherein the path on said surface upon which said beam impinges overlaps in successive rotations so that said surface is heated to a substantially uniform maximum temperature for reforming thereof.

11. A method as set forth in claim 10 wherein said overlap is between about 5 and about 70%.

12. A method as set forth in claim 9 wherein scanning is carried out at a high ratio of circumferential to translational velocity such that dwell time is substantially entirely governed by the circumferential velocity.

13. A method as set forth in claim 12 wherein the beam impinging on said surface is of elongate configuration with its short dimension in the direction of circumferential movement and its long dimension in the direction of translational movement of said object.

14. A method as set forth in claim 1 wherein said depth is at least about 10 μm but the glass remains at a temperature low enough to resist flow beyond a stratum having a thickness no greater than about 150 m inside said surface.

15. A method as set forth in claim 14 wherein said stratum is heated to a temperature gradient such that the viscosity at said depth is no greater than about 105 poises.

16. A method as set forth in claim 1 wherein said stratum is heated to a temperature at which its surface viscosity is no greater than about $10^{3.5}$ poises.

17. A method as set forth in claim 16 wherein the surface on which said beam impinges is heated to a temperature of at least about 1200° C.

18. A method as set forth in claim 17 wherein the temperature in said stratum is at least about 900° C. at said depth.

19. A method as set forth in claim 1 wherein said wavelength is such that the optical penetration thereof is not more than about 10 μm.

20. A method as set forth in claim 19 wherein said glass is a soda/lime glass and said wavelength is between about 5 and about 12 μm.

21. A method as set forth in claim 1 wherein impingement of said beam rapidly creates a steep temperature gradient in the surface stratum of the glass and the dwell time of said beam at any particular portion of said surface is limited so that flow inducing viscosities do not extend to a depth sufficient to result in material deformation of the object.

22. A method as set forth in claim 14 wherein said stratum is heated to a temperature at which its surface viscosity is no greater than about $10^{3.5}$ poises.

23. A method as set forth in claim 22 wherein the surface on which said beam impinges is heated to a temperature of at least about 1200° C.

24. A method as set forth in claim 23 wherein the temperature in said stratum is at least about 900° C. at said depth.

25. A method as set forth in claim 1 wherein said object comprises a glass container.

26. A method as set forth in claim 1 or 25 further comprising applying a coating over said object after reformation of the surface thereof to protect said surface from abrasion and preserve it from the formation of additional imperfections.

27. A method as set forth in claim 26 wherein said coating comprises an inorganic oxide selected from the group consisting of tin oxide and titanium oxide.

28. A method as set forth in claim 27 wherein said coating comprises a plastic containment coating over said oxide coating.

29. A method as set forth in claim 26 wherein said coating comprises a plastic containment coating.

* * * * *